Feb. 14, 1939.     E. O. HAMREN     2,146,952
TREE PRUNING IMPLEMENT
Filed March 9, 1937
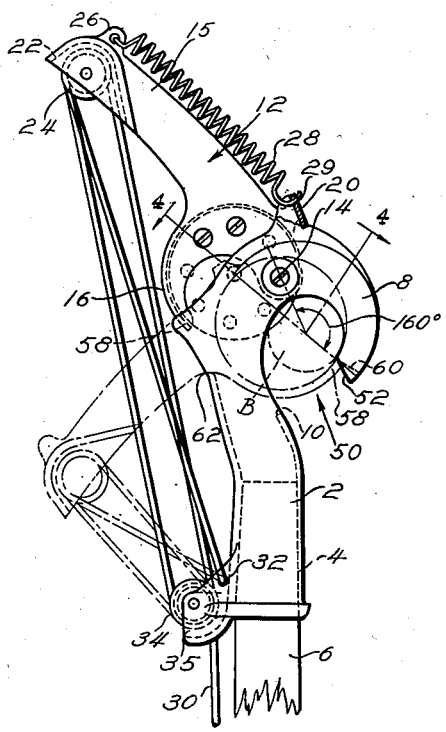
Fig.1
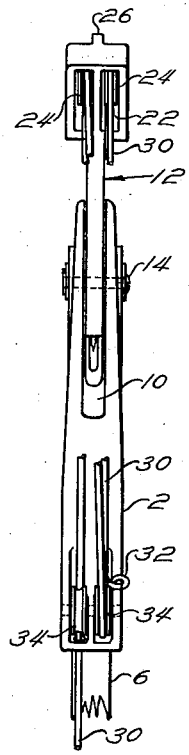
Fig.2
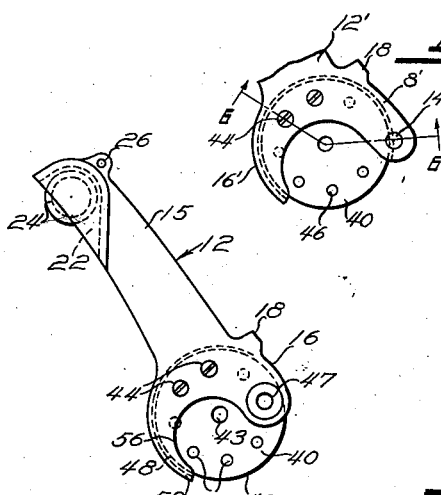
Fig.3
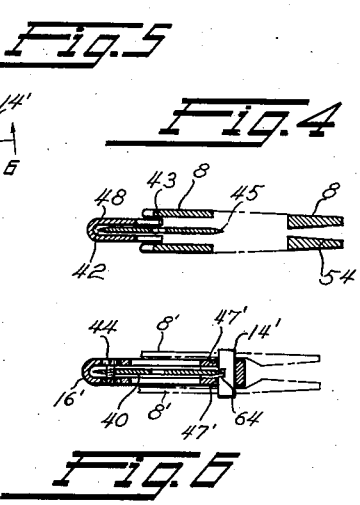
Fig.5 / Fig.4 / Fig.6
Inventor
Eric O. Hamren
By Strauch & Hoffman
Attorneys Patented Feb. 14, 1939

2,146,952

UNITED STATES PATENT OFFICE 2,146,952

TREE PRUNING IMPLEMENT

Eric O. Hamren, Hagerstown, Md.

Application March 9, 1937, Serial No. 129,908

4 Claims. (Cl. 30—249)

This invention relates to cutting implements and particularly to that type of cutting implement utilized to sever branches from trees and which is commonly known as a "pruning-hook", "pruner", "branch cutter" or "tree trimmer".

As is generally known implements of this kind usually consist of a cutting device mounted on a relatively long handle and provided with some sort of operating means arranged so as to permit actuation of said device from a point remote therefrom and adjacent the lower end of said handle.

Due to the rather severe operating conditions under which devices of this type are used it is highly desirable that they be rugged and durable in structure and since they must be carried about and held upwards into the tree, during the cutting operation, by the operator, it is also important that they be of minimum weight. It is, therefore, a major object of my invention to provide a novel pruning implement which is light in weight and at the same time rugged and durable in construction, as well as easy and economical to manufacture.

As the operator is required to hold the implement up in the tree with one hand, thus leaving only the other hand and arm free to actuate the device, it is requisite that the amount of manual effort attendant upon said actuation be reduced as much as possible. It is, therefore, a further object of my invention to provide in a device of this kind a novel cutter mounting and actuating means, which, due to the "slicing action" of the blade, resulting from the manner of mounting the cutter carrying arm, and the novel means for actuating the cutter carrying arm, greatly reduces the manual effort consumed in the operation of the device and permits the severance of even the larger branches with comparative ease.

The improved "slicing" action also results in a cleaner cut whereby the stump of the severed branch is not brushed or mutilated but is left in proper condition for healing or further treatment, such as painting or waxing.

As devices of this kind are generally used at considerable distances from a repair or sharpening shop and since the nature of the device precludes sharpening in the field the dulling or breaking of the cutting edge of the blade may occasion great delay and inconvenience, as well as expense, occasioned by the frequent and necessary trips to the shop and consequent interruption of work. It is, therefore, a further object of my invention to provide a novel and improved type of cutting blade, for a device of this kind, whereby a plurality of cutting edges are provided and to provide also a novel mounting means therefor permitting the adjustment of said blade into several cutting positions, thus bringing any one of several cutting edge portions into operative position as desired; whereby the intervals between sharpening or repair are very materially lengthened.

It is also an object to provide an improved cutting blade and mounting therefor which permits the ready removal of worn out blades or blades broken so as to be unfit for further use and the easy replacement thereof by new cutting blades.

It is also an object of my invention to provide an improved means for mounting the cutting blade in a device of this kind which supports the blade in an unusually strong manner even when the blade itself is quite thin.

In cutting devices of this type considerable difficulty is experienced in the clogging or fouling of the same with bark or bits of wood from the severed branch and this is especially true where the cutting blade, at the end of its cutting stroke, projects into a slot or equivalent recess in the hook member against which the blade clamps the limb or branch. It is therefore a still further object of my invention to provide, in a device of this kind, an improved hook portion having a recess therein, for reception of the blade, the recess being so designed as to render it self-cleaning, thereby obviating the above-mentioned difficulty.

It is also a further object of my invention to provide in a device of this type an improved clamping or hook portion which comprises spaced side-walls supporting the branch being cut on each side of the cutter thus obviating the bending or partial breaking thereof and thereby making possible a clean and smooth cut.

It is a further object of my invention to furnish an improved cutting blade for a device of this kind which is provided with a plurality of holes or perforations arranged so that certain of the same may be used for securing the blade in place while the remainder operate to lessen the resistance of the blade in cutting or slicing.

Another object of my invention is to provide an improved means for pivoting the cutter-carrying arm, of a device of this kind, in a body portion so that said arm may be readily removed therefrom by simply releasing the cutter securing means.

The above and further objects will become apparent from a study of the following detailed description of a preferred embodiment of my invention, when taken in conjunction with the appended claims and accompanying drawing, where:

Figure 1 is a side elevation of my improved pruning implement showing the cutter carrying arm in "open" position in solid lines and in "closed" position in broken lines.

Figure 2 is a view of the device shown in Figure 1, taken at right angles to that figure, and from the left-hand side thereof, with the cutter carrying arm in "open" position.

Figure 3 is a detail view of the cutter carrying arm showing the manner of mounting the cutting element therein as well as the form of the arm itself.

Figure 4 is a sectional view taken along the angled line 4—4 of Figure 1, looking in the direction of the arrows.

Figure 5 is a partial view of a modification.

Figure 6 is a sectional view of Figure 5 taken on line 5—5 looking in the direction of the arrows.

With continued reference to the drawing, wherein like reference characters are used to designate like parts wherever they appear, and with particular reference to Figures 1 and 2 a body portion 2, formed by casting or in any other convenient manner and preferably made of some light metal, such as aluminum or aluminum alloy, is shaped to provide a tapered recess 4 adapted to receive the upper end of a handle or pole 6, of which only a portion is shown and which may be of any desired length. The upper portion of the body 2 is shaped to form a hooked end 8 and is bifurcated, as at 10, for the reception of a cutter carrying arm 12.

The arm 12 is pivotally mounted in the bifurcated portion 10 on a pivot pin or bolt 14, and is provided with an extended portion 15 carrying at its lower end a widened section 16 which is generally semi-circular in shape. Adjacent this widened portion the arm 12 is formed with a projection 18 which serves to arrest the pivotal movement thereof in one direction by virtue of its engagement with a transverse web 20 on the body 2. The outer end of the extended portion 15 has therein a recess 22 in which are rotatably mounted two similar sheaves 24—24. Adjacent recess 22 is an apertured lug 26 which receives one end of a tension spring 28, the other end of which is secured in a hole 29 in the web 20. Spring 28 constantly tends to rotate the arm 12 in a clockwise direction and normally holds projection 18 against the web 20.

In Figures 5 and 6, a modified arrangement for mounting the cutter holder 16' in the body 2 is shown. Figure 5 is a side elevation of the lower portion of the arm 12' while Figure 6 is a sectional view taken on the line 6—6 of Figure 5 and with portions 8' of the body 2 shown in phantom lines to illustrate the pivot joint arrangement. In this form a pivot pin 14' is located with its axis just beyond the periphery of the cutting blade 40 and closely adjacent thereto so that a portion of the cutting edge of the blade 40 extends into and engages the sides of a notch 64 provided in the pivot pin. Apertures 47'—47' in the arm 16', which correspond to the apertures 47—47 of Figure 3, loosely receive the pin 14' and the same is also loosely received by similar openings in the portions 8' of the body 2, see Figure 6. With the cutting blade 40 assembled in the holder or arm 16', by the screws 44—44, pin 14' is held in place by the interengagement of the blade 40 and the walls of notch 64 as will be readily understood. However, by releasing the blade and moving it out of engagement with the walls of notch 64 the pin 14' can be removed and the arm or cutter holder 12' disassembled from the body 2.

This arrangement provides a simple and efficient manner of pivoting the arm 12' on the body 2 whereby ease of assembly and disassembly is obtained yet the parts are positively held in assembled relation and accidental separation thereof is obviated. Also this arrangement permits the use of a smaller cutting blade, which is sometimes desirable.

A rope or similar flexible element 30, secured at end 32 to the body 2, is reeved over the pulleys 24—24 and over one of two pulleys 34—34 mounted in an extension 35 of the body 2. The free end of the rope 30 passes over the other of pulleys 34 and extends to the lower end of the handle 6. As will be readily apparent a pull on the rope 30 will move the arm 12 from its position as shown in solid lines on Figure 1 to the position indicated in broken lines thereon. It will also be noted that the force exerted by such a pull will be greatly multiplied. This multiplication of force results from the mechanical advantage of the pulley system, above described, and also because of the great length of the arm 15 from its point of pivotal support 14 to the axis of pulleys 24—24 as compared to the distance from said pivot point to the cutting edge of a cutter 40 carried by said arm. In cutters intended only for light work a less number of sheaves may be used thus lessening the mechanical advantage obtained, but enabling the device to be operated by a shorter "pull" on rope 30.

The manner of mounting the cutting element or blade 40 in the arm 12 is shown in Figure 3. The blade 40, which may be circular in shape as shown, or polygonal if desired, is received in a narrow recess 42 formed in the widened portion 16 of the arm 12 and secured thereto by screws 44—44. These screws pass through a selected pair of a circular series of equally spaced openings 46 concentrically arranged about a central hole 43 in the blade 40, and also through aligned matching openings in the portion 16. The recess 42 is diametrically larger than the blade 40 so that a slight clearance 48 is provided between the cutting edge 45 of the blade and the bottom of said recess. The portion 16 is also provided with aligned openings 47 through which the pivot pin or bolt 14 extends when the arm 12 is assembled in the body 2. By virtue of the equal spacing of the openings 46—46 and the location of opening 47 it will be seen that the blade 40 can be readily adjusted and fixed in any one of a plurality of angular positions by simply removing the bolt 14 and the screws 44—44, turning the blade to bring another pair of openings 46—46 in alignment with the spaced openings in the portion 16 and reinserting the screws 44—44, and the bolt 14. Thus if one portion of the cutting edge 45 of the blade becomes dull, or is damaged, the blade may be turned to present a new and sharp cutting edge. As shown, there are eight holes, 46, in the blade and hence an equal number of adjustments may be made before removal and sharpening becomes necessary. It is also possible to remove the blade entirely and replace it by a new blade if desired. It will be observed that the blade is very strongly supported at two spaced points, by the screws 44—44, which are arranged substantially diametrically opposite from the cutting edge being used. This feature is extremely important as the blade, which is made quite thin to facilitate the cutting action, might fail under heavy working stresses if not properly supported. It will also be observed that the remaining holes 46—46, as well as the hole 43, reduce the surface area of the blade and thus operate to lessen the resistance in cutting or slicing. The hole 43 is also used in sharpening the blade. It is also possible to make my cutting blade as an integral part of the arm 12 if desired.

As previously stated the upper end of the body 2 is formed as a hook 8 and is bifurcated as at 10. The space 50 formed by the portion 8 is of sufficient diameter to receive the largest branch which can be severed by the cutter 40 and likewise the opening between the end 52 of the hook 8 and the body 2 is at least as large as the space 50.

The bifurcation 10 extends across the hook portion 8 and receives the edge of blade 40 at the end of its cutting stroke, as can be seen from the broken lines in Figure 1. This portion of the bifurcation 10 is formed to provide diverging side-walls 54, see Figure 4, in the portion 8. These walls diverge towards the outer surface of the hook 8 so that bark, or pieces of wood, from the branch being cut will pass freely therebetween and will not become wedged therein, thereby causing sticking of the blade at the end of its cutting stroke.

An important feature of my invention is the proper location of the pivot point 14 for the cutter-carrying arm 12 with respect to the cutting edge of the blade and also with respect to the hook portion 8. This pivot point should be located close to the apex of the curved portion 8 and also adjacent to the end of the arm 12 and close to the cutting edge of the blade 40. Although the exact position of this point will vary slightly along with variations in the shape and size of the hook portion it should be such as to cause the cutting edge of the blade 40 to travel across the opening 50 in an arcuate path of relatively short radius. Such curvilinear travel causes the blade to cut an interposed branch "B" with a "slicing" action which not only greatly facilitates cutting but also results in a very clean and smooth cut. In order that this slicing action will result it is necessary that the blade 40 be rigidly and non-rotatably secured to the arm 12 for if the blade 40 is rotatably mounted it will turn during the cutting action and a "slicing" effect will not be produced. With the hook and cutter arm proportioned as shown the proper pivot point location is on a line extending from the center of opening 50 and making an angle of approximately 160° with a line drawn from the outer extremity 52 of the hook portion 8 to said center. With the pivot point so located with respect to the opening 50 and the pin 14 passing through the arm 12 at one end thereof and close to the blade 40 this very desirable cutting action is obtained. It is also desirable that the radius of my circular blade be approximately equal to or just slightly less than the diameter of the opening 50. Increasing the radius of the blade tends to lessen the "slicing" effect above referred to while at the same time the blade must of course not be made so small as to not entirely cover the opening 50 when the arm 12 is in the broken line position as shown in Figure 1.

The quality of the cut is also improved by the nature of the support given the branch by the two side walls 54. It will be observed that these are positioned one on each side of the blade 40. Hence the branch is not bent or broken, under the action of the blade, but is cleanly severed thereby.

As can be more readily seen in Figure 3, the widened portion 16 is cut away on both sides to provide generally circular openings 56 which are of slightly greater diameter than the opening 50 and thus provides clearance spaces for receiving the branch being severed. The projecting portion 58 occasioned by these openings is so proportioned that, at the end of the cutting stroke, it abuts the end 52 of hook portion 8 thereby preventing contact of the blade 40 with a web 60, extending between the ends of the side-walls of hook portion 8, which would tend to dull the blade. However, the invention is not limited to this particular form of means for arresting the cutting stroke, as this depth of the bifurcation 10 may be such as to arrest the downward movement of the arm 12 by contact at the point 62, see Figure 1, before the cutting-edge of the blade 40 would contact the web 60. As shown both of these conditions exist but it will of course be understood either one alone will produce this desired result. The widened portion 16 partially surrounds the cutter and as can be seen in Figure 1 acts as a guard thereby preventing accidental contact of the hands with the sharpened edge thereof.

It will also be observed that when the arm 12 is in the solid line position in Figure 1 a small portion of the blade 40 extends into the opening 50, and the blade is rigidly held in this position by reason of arm 12 abutting web 20. While this has the appearance of slightly reducing the size of the opening 50 such is not the case and this arrangement adds to the facility of operation of the device, particularly when branches of a size approaching that of opening 50 are being cut. By simply hooking the portion 8 over the branch and pulling down on the handle 6 the extended portion of the cutter 40 will make a partial cut in the branch and hold the device from relative sliding movement in respect thereto. Thus no effort is necessary to hold the device at the desired point along the branch while at the same time initiating the cut by pulling on the cord 30. The amount which the blade or cutter 40 projects may of course be regulated by varying the size of the projection 18 or by changing the position of web 20.

It is believed that the operation of my improved device will be obvious to those skilled in the art but it is briefly as follows: The hook portion 8 is caught over the limb or branch to be removed from the tree and a slight downward pull exerted on the pole 6 by the operator to cause the blade 40 to bite into the branch and hold the device in place. Then, with his other hand the operator pulls the cord 30 thereby moving the cutter carrying arm 12 and the cutter 40 from the solid line position of Figure 1 to the broken line position, thus severing the branch or limb. By virtue of the mechanical advantage resulting from the block and tackle arrangement of pulleys 24 and 34, as well as the leverage effect of the arm 12, a minimum of physical effort is required in pulling the cord 30 and even the largest branches which can be received in the opening 50 may be readily severed. Also the slicing action greatly facilitates the cutting action as well as improves the quality of the cut in a manner which is obvious. The latter is of importance in the pruning of trees as it is highly desirable that the stump of the limb be not mutilated or crushed in the cutting action.

Another important feature of my invention is the arrangement of the cord 30 parallel to and adjacent to the pole 6. Thus an absolute minimum of bending stress is applied to the pole during the actuation of the device. This is especially desirable when the pole 6 is extremely long, as when the device is to be used to sever branches located high up in the tree, as the cross-section thereof may be kept of minimum size and the weight thus materially reduced. It will be understood that poles of various lengths may be selectively inserted in the recess 4 to adapt the device for use on trees of different heights.

Thus it is seen that I have provided a novel and improved pruning implement which is simple and easy to construct but durable and rugged in character. My improved device enables even the largest branches to be readily and cleanly severed with a minimum of manual effort and is at the same time light enough to be conveniently carried about. The provision of my improved blade and means of mounting the same materially reduces the time and expense involved in re-sharpening and repair and also permits replacements. My improved cutter operating means not only lightens the labor involved in cutting but enables the use of a smaller handle thereby further lightening the device.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a pruning implement, a body, an arm having an elongated portion and a widened portion, said widened portion having spaced side-walls forming a substantially semi-circular recess, a substantially circular disc-like cutter of slightly smaller diameter than said recess and provided with a circular series of equally spaced openings adjacent its periphery and concentric to the center thereof received in said recess, a plurality of sets of aligned openings in said widened portion spaced to coincide with said cutter openings, spaced cutter securing means passing through certain of said cutter and widened portion openings, said securing means being arranged so that a line joining the same is substantially normal to the forces acting on said cutter during cutting, and a pivot pin passing through other of said cutter and widened portion openings and carried by said body.

2. In a pruning implement, a body provided with a curved section forming an open hook, said hook having spaced side-walls providing a recess therein, an arm pivoted between said side-walls and carrying a cutter, said cutter being adapted to travel across the opening formed by said hook upon pivotal movement of said arm and to project into said recess, said spaced side-walls operating to form spaced supporting abutments on opposite sides of said cutter for an object positioned in said opening and operated on by said cutter, said side-walls diverging outwardly from said opening whereby foreign matter is readily forced therebetween by said cutter.

3. In a pruning implement, a body, a downwardly opening hook portion on said body, an arm pivoted at one end to said body on an axis adjacent to the apex of said hook portion, a cutter comprising a disc-like element non-rotatably mounted in said arm eccentrically to the pivotal axis thereof and provided with a circular cutting edge positioned adjacent said pivoted end and extending just slightly beyond said axis, whereby pivotal movement of said arm causes said cutting edge to pass across the opening of said hook portion in an arcuate path of small radius for exerting a slicing action upon a branch or limb disposed in said hook portion.

4. In a pruning implement, a body, an arm pivoted to said body by means of a pivot pin, a disc-like cutter, releasable means for securing said cutter to said arm, said pivot pin being loosely mounted in said arm and said body in overlapping relation to the edge of said cutter, a recess in said pin adapted to receive a portion of said cutter, whereby said pin is held in assembled position in said arm and body by said cutter and may be removed therefrom by releasing said cutter from said arm.

ERIC O. HAMREN.